Jan. 2, 1968   E. O. AICHELE   3,360,827
PLASTIC DISPENSING MEANS
Filed May 10, 1965   5 Sheets-Sheet 3

INVENTOR.
MARIE K. AICHELE, ADMINISTRATRIX
ESTATE OF ERNEST O. AICHELE
BY
Harry G. Shapiro
ATTORNEY Jan. 2, 1968     E. O. AICHELE     3,360,827
PLASTIC DISPENSING MEANS Filed May 10, 1965     5 Sheets-Sheet 4

INVENTOR.
MARIE K. AICHELE, ADMINISTRATRIX
ESTATE OF ERNEST O. AICHELE
BY
Harry S. Shapiro
ATTORNEY

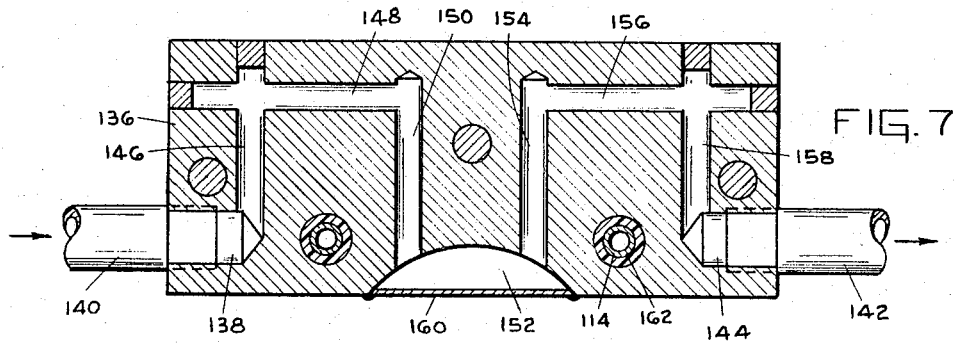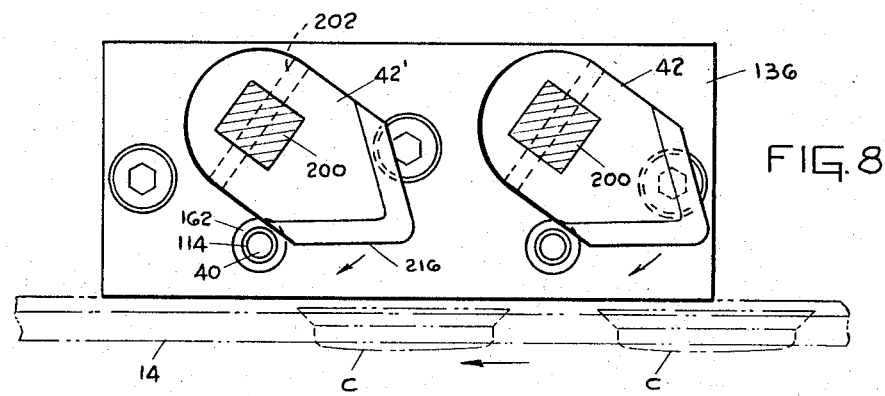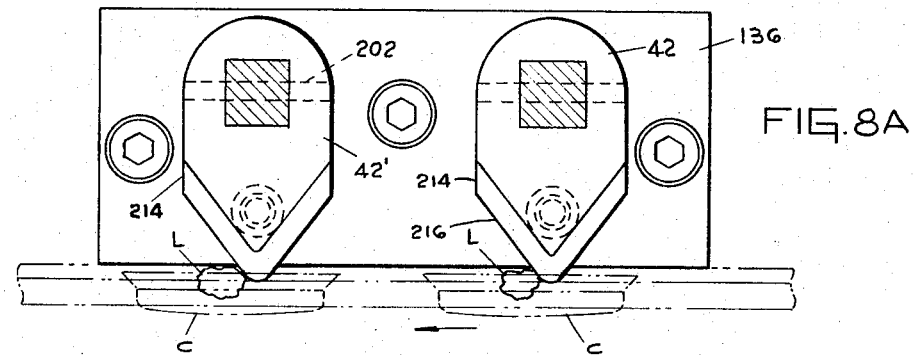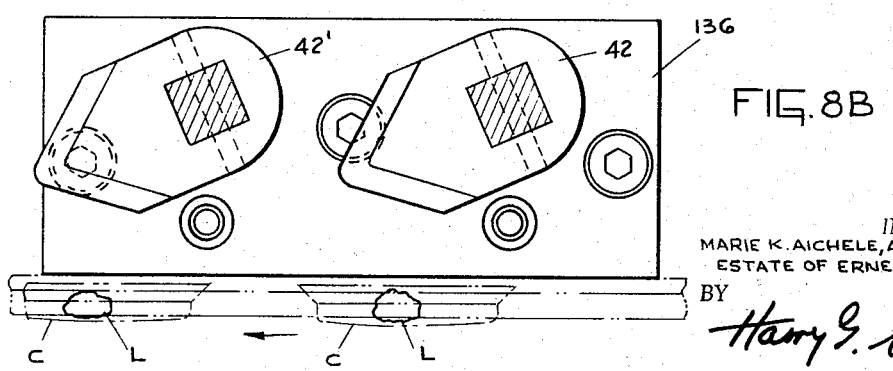

3,360,827
PLASTIC DISPENSING MEANS
Ernest O. Aichele, deceased, late of Hillside, N.J., by Marie K. Aichele, administratrix, 300 Hollywood Ave., Hillside, N.J. 07205
Filed May 10, 1965, Ser. No. 455,053
9 Claims. (Cl. 18—20)

ABSTRACT OF THE DISCLOSURE

A plastic dispensing device in which plastic material is fed to a rotatably mounted blade. The blade is constructed to cut the plastic material and to deliver the amount cut to a selected location. More particularly, the rotatable blade is mounted directly over a conveyor, with the blade and the conveyor operated continuously and in synchronism so that the blade delivers individual, predetermined amounts of plastic material to the conveyor.

---

The invention relates to improvements in means for dispensing or metering predetermined amounts of plastic material and is more particularly directed to a machine for making plastic lined bottle caps which includes such means.

Aichele Patent No. 3,135,019 granted June 2, 1964, discloses a machine for providing bottle caps or the like with sealing liners by directly depositing charges of thermoplastic material in bottle caps in timed sequence, following which the charge in each cap is molded to provide a sealing liner for the cap. The individual charges of plastic material are quite small, being on the order of only a fraction of a gram. The charge must be of sufficient amount to suitably line the bottle cap upon molding. On the other hand, it is essential that the quantity of the charge be not so great as to interfere with proper molding, or to be forced onto the rim or skirt of the cap, as a result of which the product is defective and must be discarded.

It will be appreciated that with charges so small, the quantity of each charge is highly critical; a small variation from the desired predetermined amount results in a substantial measure of error or inaccuracy. Moreover, the critically accurate quantities deposited in the individual caps must be accomplished in timed sequence at high speeds so that the machine will be economical to operate.

An object of the invention is to provide improved means for dispensing charges of plastic material in accurate amounts, and to accomplish the delivery or deposit of the charges at high rates of speed.

Another object of the invention is to provide improved means for dispensing charges of plastic material in accurate amounts which enables a substantial increase in the production of a machine for applying sealing liners to bottle caps.

While the invention is particularly suitable for use in connection with the lining of bottle caps or the like, and will be described in relation to a bottle cap lining machine, the dispensing device of the invention is not limited to this particular application or use. The device of the invention may be used wherever the supply of plastic material in accurately ascertained quantities at high rates of delivery is desired.

These, and other objects and advantages of the invention will be apparent from the following detailed description, taken in conjunction with the drawings, which illustrate a preferred embodiment of the dispensing device of the invention with reference to a machine for lining bottle caps, in which:

FIG. 7 is an enlarged, vertical, cross-sectional view taken approximately in the plane of line 7—7 of FIG. 4; and FIGS. 8, 8A and 8B are views looking in the direction of line 8—8 of FIG. 4, these views showing successive stages of a cycle of the metering blades as they deliver charges of plastic material to caps to be lined with plastic material.

Figure 1:
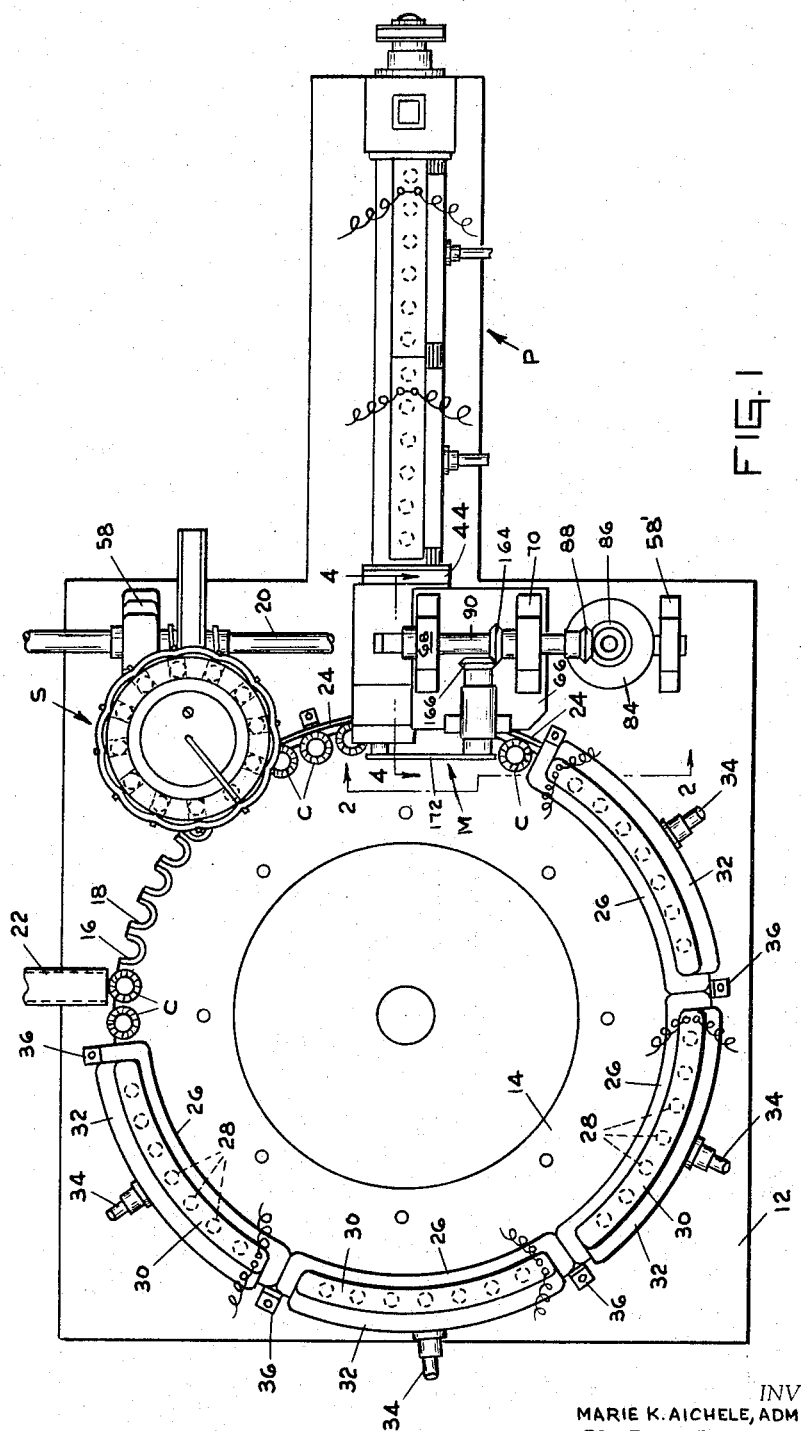
FIG. 1 is a top plan view of a cap seal lining machine which includes the plastic dispensing means of the invention.

Since the improved dispensing means of the invention is particularly adapted for use in connection with a machine of the type disclosed in the aforementioned Aichele Patent No. 3,135,019, such dispensing means, designated M, is shown in FIG. 1 associated with such type of machine. The machine will be described only to the extent of indicating the manner in which the metering means of the present invention cooperates with the relevant associated parts thereof. The detailed structure of the preferred form of dispensing device is illustrated in FIGS. 2–8.

As shown in FIG. 1, the bottle cap lining machine has a bedplate 12 which is suitably supported on a floor by legs or any other supporting means. Mounted on the bedplate 12 is a rotatable turntable conveyor 14 provided at its margin or outer periphery with a series of circumferentially spaced, outwardly open, cap-receiving notches 16. The notches are provided with countersunk integral ledges or lips 18 upon which are seated the peripheral skirts of cap bodies C, thus suspending the caps from the turntable conveyor 14. The turntable is rotated continuously by a drive mechanism including a main drive shaft 20. The details of the drive mechanism for the turntable are disclosed in the aforementioned Aichele patent. Rotation of the turntable carries the caps C to the dispensing means M which, as will be subsequently described in detail, deposits a measured amount L of a thermoplastic seal liner forming material in the interior of each cap as it passes the metering means. Thereafter, the thus supplied caps are delivered by the turntable conveyor to means S where the plastic charge in each cap is molded to provide the seal liner for the cap.

In order for the turntable 14 to present caps to the metering means M and to the seal liner molding means S, the caps may be delivered to and successively positioned in the receiving notches 16 from a loading chute 22. A keeper ring or member 24 surrounds that portion of the turntable conveyor 14 which carries the caps from the loading chute 22 of the cap supply means to the dispensing means M and to the seal liner molding means S.

The keeper ring prevents outward displacement of the caps from the supporting notches 16 to the point where the caps are engaged by and are withdrawn from the turntable conveyor by the seal liner molding means.

Still referring to FIG. 1, the turntable conveyor 14 may have associated therewith means for preheating the caps to an elevated temperature. The cap preheating means extends from a point adjacent to the cap loading chute 22 to a point adjacent to the metering means and is disposed in overlying relation to the notched, marginal portions 16 of the turntable conveyor and the caps carried thereby. As shown, the cap preheating means comprises air chamber means 26 through which the conveyed caps C pass. The air chamber means is supplied by air heated by electric heater coils 28 which are arranged in connection with air receiving header means 30 having air delivery manifolds 32. Air is delivered to the manifolds by conduits 34, the latter being supplied by suitable means such as blower means (not shown). The cap preheating means is stationary and is mounted on the bedplate 12 by supporting brackets or posts 36.

The plastic material which is delivered to the metering means M and subjected to the operation thereof may have directly associated therewith means P for conditioning the thermoplastic material, as shown in FIG. 1. The conditioning means P is described in detail in the aforementioned Aichele patent and need not be described here for it forms no part of the present invention. Suffice it to say that the dispensing means is supplied with heated plastic material maintained under sufficient and constant pressure to present a selected predetermined cross-section of a continuously fed stream of plastic material to one or more rotating blades, which act at predetermined intervals to cut off and deliver predetermined quantities of the plastic material. It is within the scope of the invention to use any desired means to condition the plastic material or make the plastic material a molten or flowable composition supplied under pressure to the metering means. The plastic material is preferably a thermoplastic compound such as polyethylene or a vinyl resin such as polyvinyl chloride or a copolymer or vinyl chloride and vinyl acetate. If desired, a suitable compound of a thermosetting resin may be used.

Although the dispensing device may be driven or actuated by any desired drive mechanism, where the device is associated with the parts of a bottle cap lining machine, it is convenient to operate the device by the same means or main drive shaft 20 which rotates the turntable conveyor 14. It will, of course, be understood that the metering device of the invention, which is here shown supported on the machine bedplate 12, may be suitably supported in any desired manner and in relation to any conveying means intended to receive measured charges of plastic material. Also, while the conveying means herein illustrated is in the form of a rotatable turntable, it is contemplated that the conveying means for receiving the charges may be in the form of a belt conveyor which travels linearly or in a straight line, whether or not such belt conveyor carries objects to receive the plastic charges.

Figure 4:
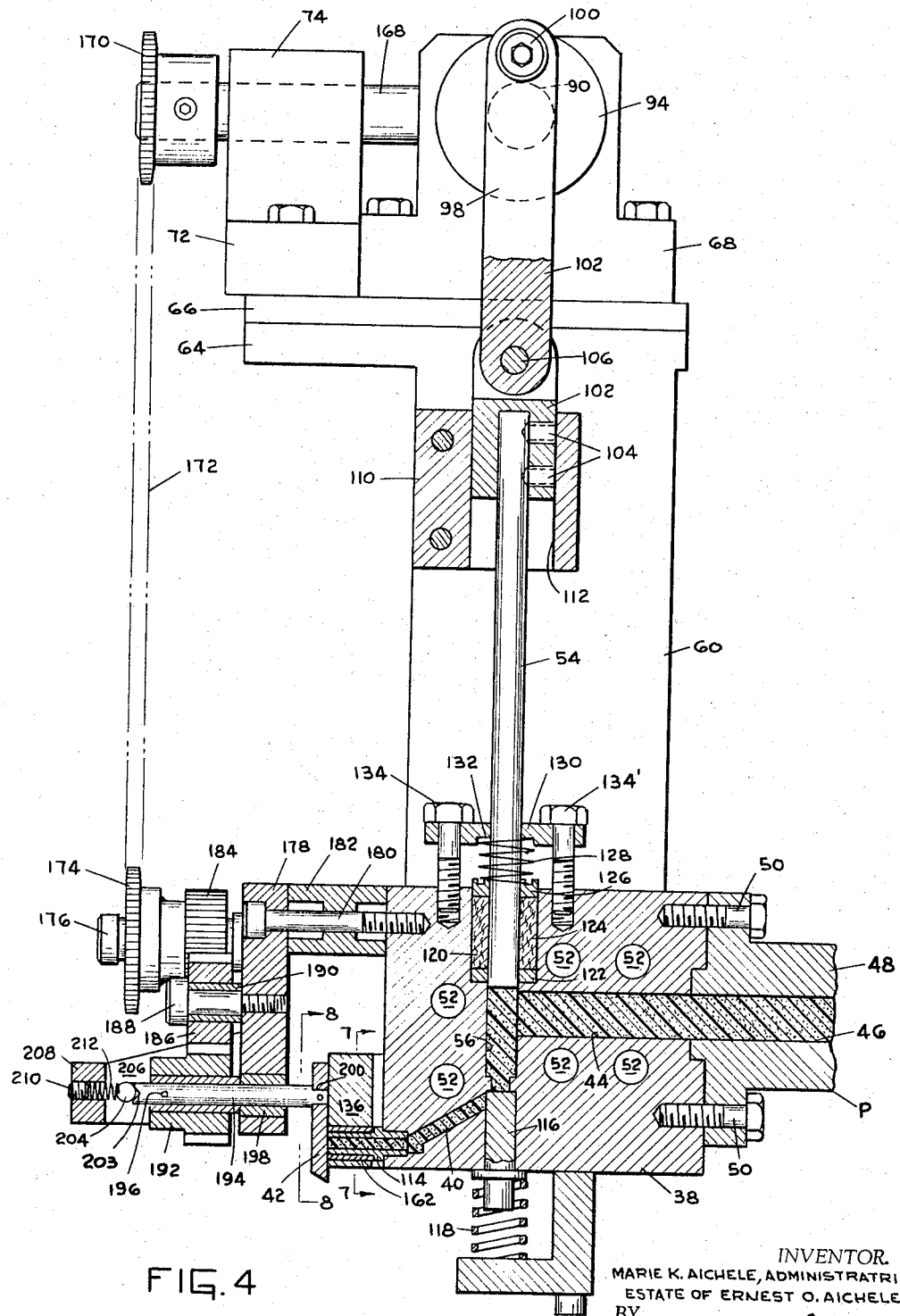
FIG. 4 is a vertical, cross-sectional view taken approximately in the plane of line 4—4 of FIG. 1.

Referring to FIG. 4, the dispensing device generally comprises a body or block 38 having a discharge passage 40 which is kept filled with plastic material in heated condition. The plastic material is expelled through the exit end of the discharge passage where it is acted upon or cut off by a rotary blade 42. In order to increase the production of the device, more than one rotary blade may be used, the second such blade being designated 42'. Accordingly, the second rotary blade has a second discharge passage associated therewith.

In greater detail, and referring to FIG. 4, the discharge passage 40 is in communication with an intake passage 44 formed in the block 38. The intake passage is in communication with a passage 46 formed in a coupling fitting 48 leading from the plastic material conditioning means P. The block 38 may be secured to the fitting 48 by bolts 50. The block is heated by a suitable fluid such as hot water in order to maintain the plastic material passing therethrough in a heated or molten condition. For this purpose the block may be provided with a series of passages 52 for the circulation of the heated fluid through the block.

In the illustrated form of the invention, a measuring plunger 54 is provided to furnish and convey predetermined quantities of plastic material to and through the discharge passage 40. As shown in FIG. 4, the block 38 is provided with a vertical bore 56 within which the measuring plunger 54 is reciprocated. The bore 56 is positioned intermediate the exit end of the intake passage 44 and the entrance to the discharge passage 40. Where, as preferred, a pair of rotary blades 42, 42' are used, a pair of associated measuring plungers 54 and 54' are provided.

Although the interposition of a measuring plunger or plunger between the intake and discharge passages is shown, the measuring plungers are not essential for the operation of the dispensing device. The rotary blades may be associated with discharge passages which are maintained filled with plastic material directly supplied thereto from any suitable source. With the exit end of the discharge passage of a selected predetermined diameter, and with the plastic material in the discharge passage maintained at a selected and constant pressure, the rotation of the blade associated with the discharge passage at a selected rate of rotation results in plastic charges of selected uniform quantity being dispensed.

Figure 2:
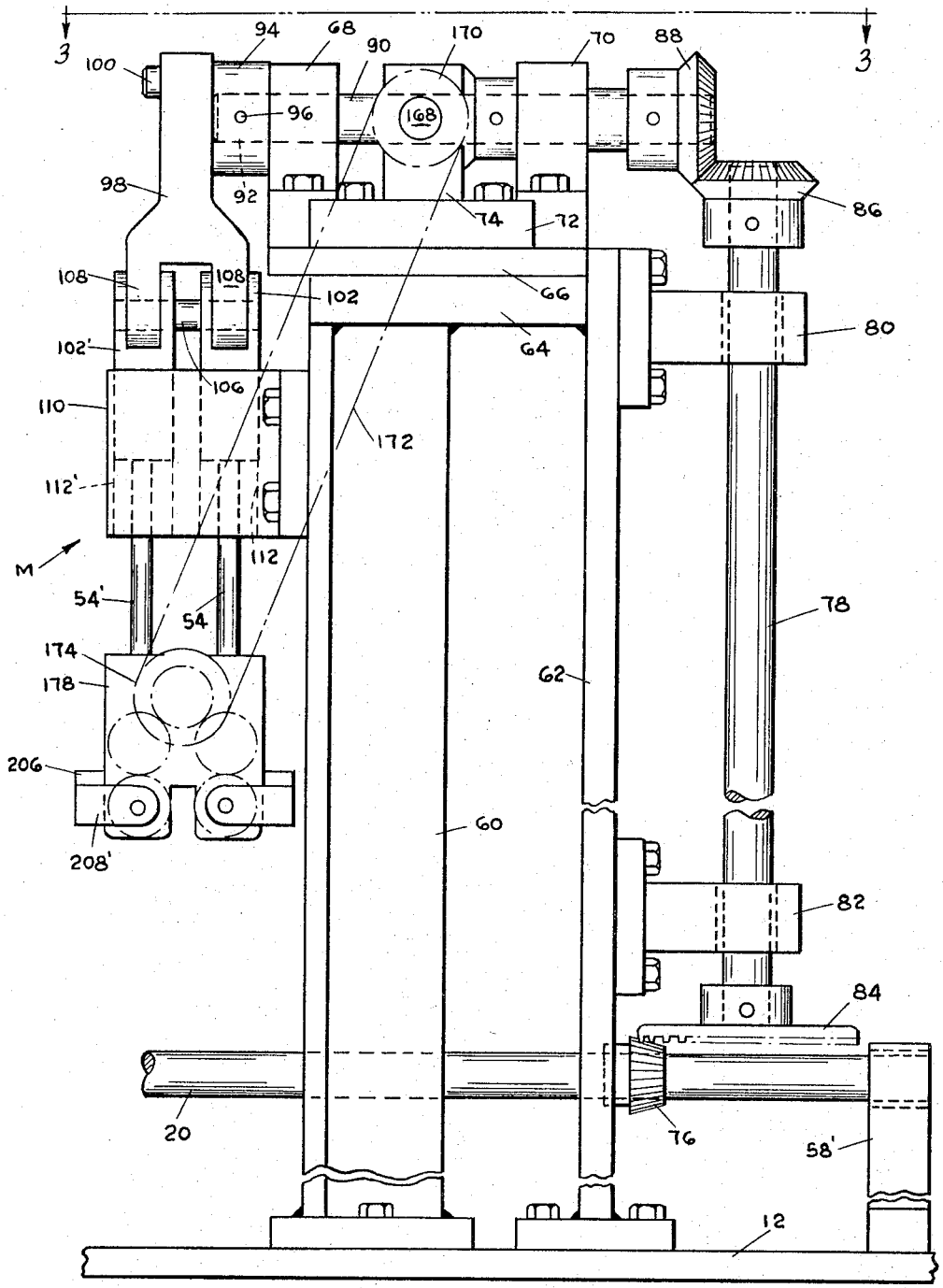
FIG. 2 is a view taken approximately in the plane of line 2—2 of FIG. 1, this view showing a drive mechanism for the illustrated dispensing means.

As illustrated in FIGS. 1 and 2, the main drive shaft 20 is journaled in a pair of spaced pillow blocks 58, 58' supported on the bedplate 12. As shown in FIG. 2, a pair of laterally spaced vertical standards 60 and 62 are respectively bolted to the bedplate 12. A platform 64 is welded to the standards 60 and 62 at the top thereof to provide a support for a plate 66. The plate 66 provides a base for a pair of transversely spaced pillow blocks 68 and 70. The plate 66 also furnishes a support for a base plate 72 upon which a shaft bearing 74 is mounted, as shown in FIGS. 2 and 3.

As shown in FIG. 2, the main shaft 20 is provided with a miter gear 76 fixed to rotate with the main shaft. A vertical shaft 78 is journaled in and extends through a pair of vertically spaced pillow blocks 80 and 82, the pillow blocks being respectively fastened to the side of the standard 62. The lower end of the shaft 78 has a plate gear 84 secured thereto which is in meshing engagement with the miter gear 76 on the main shaft. The upper end of the shaft 78 has a miter gear 86 fastened thereto, such gear meshing with a mating gear 88 secured to the end of a horizontally extending shaft 90 which is journaled in the aforementioned pillow blocks 68 and 70.

Figure 3:
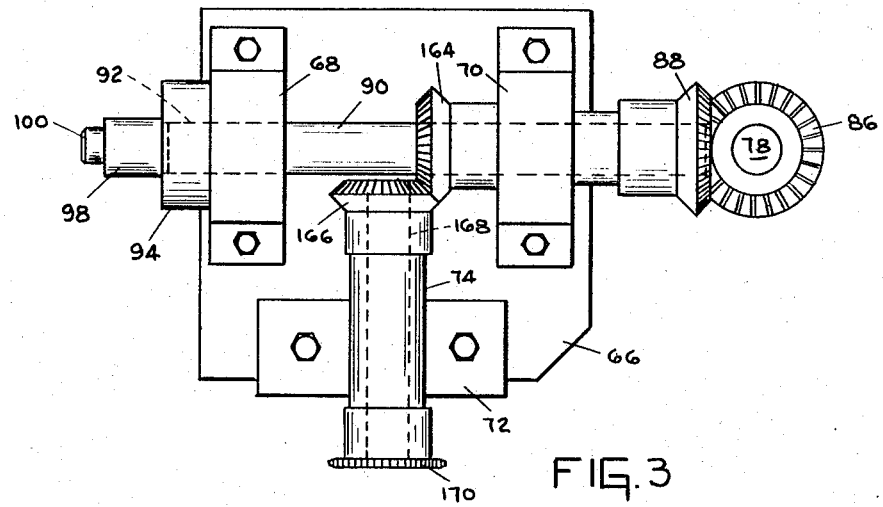
FIG. 3 is a top plan view of the drive mechanism for the dispensing device looking in the direction of line 3—3 of FIG. 2.

As shown in FIGS. 2 and 3, the shaft 90 extends beyond the pillow block 68 and is received in a central opening 92 formed in a circular member 94. The circular member is fixedly secured to the shaft 90 by a pin 96 (FIG. 2). As shown in FIGS. 2 and 4, a bifurcated yoke 98 is eccentrically mounted upon the rotary member 94 by connecting the yoke to such member near an edge thereof by a shoulder screw 100. Thus, rotation of the main shaft 20 causes rotation of the vertical shaft 78, and rotation of the shaft 90 to thereby impart vertical reciprocation to the yoke 98.

In the preferred form of the invention, and where it is desired to double the output of the machine, the reciprocating yoke 98 actuates a pair of the aforementioned measuring plungers 54, 54' as shown in FIG. 2. Each plunger has its upper end respectively supported in blocks 102, 102' to which each plunger is fastened by a pair of cone-pointed set screws 104 (FIG. 4). The plunger blocks 102, 102' are connected to the yoke member 98 by extending a single pin 106 through apertures formed in the upper ends of the plunger blocks and through aligned openings formed in the spaced arms 108, 108' of the yoke member 98. The plungers are restrained for vertical movement by providing a guide 110 having a pair of vertical openings 112, 112' for the plunger blocks 102, 102'. The guide 110 is secured to the side of the upright or standard 60 as shown in FIGS. 2 and 4.

As shown in FIG. 4, the working end of each measuring plunger is respectively received in a vertically extending bore provided in the body section or block 38. The description of the relationship of one measuring plunger with respect to the block 38 and the operation of the plunger with respect to the intake and discharge passages 44 and 40 is equally applicable for the other plunger and its related passages in the block.

As shown in FIG. 4, the vertically reciprocable measuring plunger 54, upon downward movement intersects and crosses the exit end of the intake passage 44. The discharge passage 40 preferably is formed in the block 38 to lie in a different plane or on a level just below the intake passage 44, and in communication with the opening or bore 56 into which the measuring plunger extends. The entrance end of the discharge passage and the exit end of the intake passage are on opposite sides of the bore 56. The discharge passage 40 extends forwardly and is inclined downwardly, its exit end being provided with an extension in the form of a nozzle 114 which is threaded into the block 38. The purpose of this extension of the discharge passage will be subsequently explained.

As shown in FIG. 4, a downwardly yieldable check valve 116 is slidably mounted in the block 38 in alignment with the measuring plunger 54 below the intake passage 44. The check valve is normally urged upward by a compression spring 118 to intersect and close off the entrance to the discharge passage 40, such closing action taking place when the measuring plunger 54 is in its up position, as shown in FIG. 4. The flow of the plastic material into the discharge passage 40 is assured when the measuring plunger is moved down, and backflow of plastic material contained in the discharge passage is prevented by the check valve.

In order that each measuring plunger may be provided with suitable packing without necessitating frequent replacement of the packing, the bore 56 is provided with a counterbore 120 in which there is positioned a steel washer 122, an asbestos packing 124 and a second steel washer 126. As shown in FIG. 4, the washer 126 is cupped on its top side to provide a bearing for one end of a compression spring 128, the opposite side of the spring bearing against the underside of a plate 130 having a recess 132 to receive the end of the spring. The plate 130 has a pair of screws 134, 134' extended therethrough, the ends of the screws being threaded into the block 38. The plate 130 has a central opening therethrough to allow the plunger 54 to extend through the plate and through the washers and packing and into the bore 56 in the block 38. When the packing 124 becomes worn, the force of the spring 128 is lessened. Upon tightening the screws 134, 134', the pressure upon the spring 128 is increased thereby applying a compressive force to the packing.

Figures 5, 6:
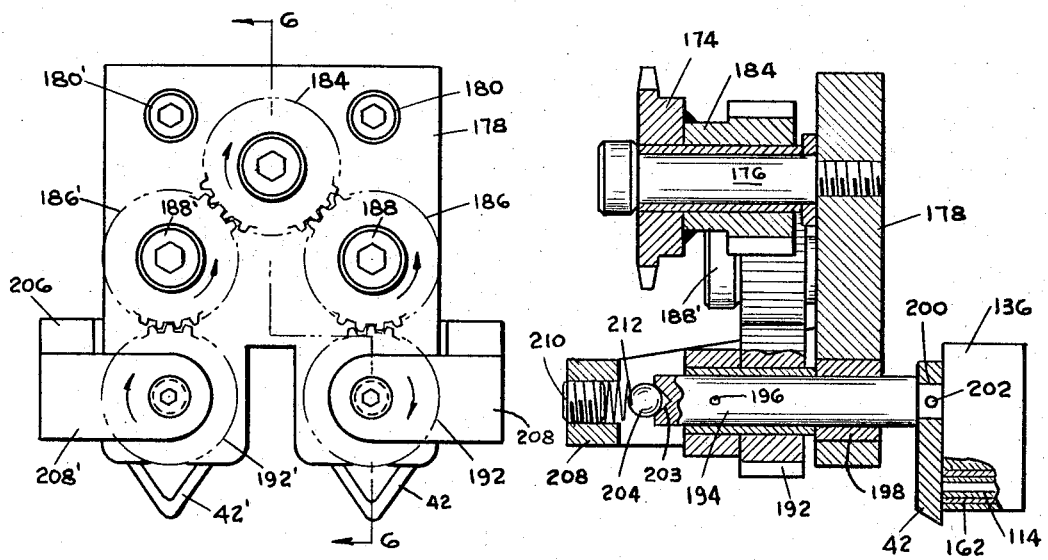
FIG. 5 is a enlarged, elevational view showing the dispensing or metering blades, and a mounting means and drive means for the blades.
FIG. 6 is a vertical, cross-sectional view taken approximately in the plane of line 6—6 of FIG. 5.

As shown in FIGS. 4 and 6, the aforementioned discharge passage extension or nozzle 114, there being one nozzle for each discharge passage and each rotary blade, is positioned to extend through a smaller block 136 adjacent to and forward of the block 38. The rotary blades 42, 42' overhang the margin of the turntable conveyor 14. The block 136 is cooled in order that the rotary blades associated therewith will not become smeared, or cause smearing of the plastic material which is fed through the sleeve 114, and cut off by each blade.

As shown in FIG. 7, the block 136, which preferably is made of steel, is provided with suitable passages for the circulation of a coolant such as water at room temperature or colder. The block is provided with a short horizontal passage 138 to which an inlet hose 140 for the coolant is connected. On the opposite side of the block an outlet hose 142 is connected to an outlet passage 144. Intermediate the passages 138 and 144, the block is provided with a suitable number of connecting passages so that the block may be adequately cooled. As illustrated, the inlet and outlet passages 138 and 144 are connected by passages 146, 148, 150, 152, 154, 156 and 158. In order that the interior passages of the block may be made to communicate with one another, the block is drilled horizontally and vertically, and then plugged at the outer surface of the block, as illustrated. To connect the passages 150 and 154, the block may be milled out between such passages. A plate 160 is then welded to the block to span the passages 150 and 154 and to provide the passage 152. In order to prevent chilling of the heated plastic in the discharge passages as it is fed to a rotary blade, a heat insulating sleeve 162, preferably made of Teflon, is positioned within the block 136 to surround the extension 114, as shown in FIGS. 4 and 6.

The mounting and the drive mechanism for the rotary blade or blades 42, 42' will now be described. Although the rotary blades may be driven by a separate drive mechanism, it is preferred that they be actuated by a gear train driven by the machine's main shaft 20 and the measuring plunger actuating mechanism. As shown in FIG. 3, a miter gear 164 is fixed to rotate with the plunger actuating shaft 90, such gear being positioned on the shaft intermediate the pillow blocks 68 and 70. The gear 164 is in meshing engagement with a gear 166 fixed to the end of a stub shaft 168 journaled in the aforementioned shaft bearing 74. The stub shaft is positioned to extend at a right angle to the shaft 90.

As shown in FIGS. 3 and 4, the stub shaft 168 has a sprocket 170 secured to its forward end. A chain 172 extends over the sprocket and a second sprocket 174 which is connected to rotate about a shoulder screw 176. As shown in FIG. 6, the shoulder screw is threaded into a vertically mounted plate 178. As shown in FIG. 4, the mounting plate, which supports the gearing for the rotary blades 42, 42', is in turn secured to the heated block 38 by means of a pair of screws 180, 180' (FIG. 5) which extend through a spacer 182. The spacer insulates the mounting plate 178 from the heated block 38.

As shown in FIGS. 4 and 6, the sprocket 174 is secured, as by welding, to a drive gear 184 located rearwardly of the sprocket and forwardly of the mounting plate 178. As shown in FIG. 5, the drive gear is in meshing engagement with a pair of spaced idler gears 186, 186'. The idler gears are respectively mounted for rotation on shoulder screws 188, 188' extended into the mounting plate 178. Bronze bushings 190 are respectively pressed into the center holes of the gears so that the gears may rotate freely. The idler gears 186, 186' are respectively in meshing engagement with driven gears 192, 192'.

As shown in FIGS. 4, 5 and 6, the driven gears 192, 192' rotate the rotary blades 42, 42' in unison. The blades are independently mounted and resiliently maintained against the chilled block 136. The blades are thereby chilled, and maintained at a lower temperature than the plastic material which they cut. The driven gear 192 and its blade 42, and the same applies for the gear 192' and its associated rotary blade 42', are mounted for movement bodily in a horizontal plane. The gear 192 is fixed to an elongated blade shaft 194 to rotate therewith; also, the shaft 194 is fixed, as by a pin 196, so that the shaft cannot move axially with respect to the gear 192. The shaft 194 extends forwardly and rearwardly of the gear 192. In a rearward direction, such shaft extends through a bushing 198 press fitted into an aperture extended through the mounting plate 178. At its most rearward end, the shaft 194 is connected to the rotary blade 42 so that rotation of the gear 192 and its fixed shaft 194 will rotate the blade 42. The fixed connection of the blade shaft to the blade may be accomplished by squaring the shaft's end 200 and positioning such end in a matingly shaped hole in the blade. As shown in FIG. 8, a pin 202 is extended through the blade and the shaft end secures the parts for rotation together.

To resiliently maintain each rotary blade against the cooled block 136, the forward end of each blade shaft 194 is provided with a recess 203 to receive a spring pressed ball 204. As shown in FIGS. 5 and 6, a substantially L-shaped bracket 206 is secured to the mounting plate 178 and has its front arm 208 provided with a threaded bore to receive a set screw 210 for adjusting the pressure on the spring 212 which engages the ball 204. By such respective structures, each rotary blade is resiliently maintained against the cooled block 136.

FIGS. 8, 8A and 8B illustrate a cycle or sequence of operation of the dispensing blades as they act to simultaneously deposit a plurality of plastic charges L in successive caps C. With plastic material fed by the measuring plungers 54, 54' through their respective discharge passages 40, each complete rotation of a dispensing blade serves to cut off and deliver a plastic charge L to the interior of a cap C as the caps are continuously conveyed in the direction indicated by the arrow. As illustrated, the blades are rotated clockwise, or in the same direction as the direction of movement of the caps on the conveyor.

The blades are each formed to both shear and deliver plastic material extruded from the exit end of the discharge passage 40, or its extension 114. As illustrated, each blade is positionally related with respect to the exit end of the discharge passage to provide a cutting or shearing edge 214 which sweeps across the exit end of the discharge passage to cut off or shear the section of plastic material extruded from the discharge passage. The blade is further provided with a portion 216 disposed on a receding angle with respect to the shearing edge 206 which acts to deliver the cut off section or charge L downwardly into a cap. The thickness of the blade is chamfered or beveled at its shearing and working side to facilitate cutting and delivery of the extruded section of plastic material. Due to the resilient mounting of each dispensing blade, extrusion of plastic material from a discharge passage is unhindered when the blades are in their position of the cycle shown in FIG. 8A.

The rotation of the dispensing blades in the same direction as the direction of movement of the conveyor permits the utilization of a plurality of blades acting to deposit charges of plastic material L in a plurality of caps C simultaneously, though the dispensing blades and the conveyor have continuous movement imparted thereto. By such relationship of the parts, the production of the machine may be efficiently increased in proportion to the number of dispensing blades used. The basic difference of reciprocable and rotary motions is such that pluralizing the rotating dispensing blades affords proportionate increase in production, which cannot be as efficiently released with the pluralizing of a reciprocable dispensing device. The drive mechanism for the rotating dispensing blades is, of course, synchronized with the rate of rotation of the conveyor or turntable 14.

Subsequent to receiving charges of plastic material in successive caps, the turntable 14 brings the charged caps to the molding and shaping means S (FIG. 1) where the charges are molded to provide a sealing liner for each cap. Such means S may be essentially the same as disclosed in the aforementioned Aichele Patent No. 3,135,019 and does not constitute a part of the present invention. Where a plurality of dispensing blades are used, the molding means S, with its molding plungers, is provided with a drive mechanism which commensurately increases the rate of reciprocation of the molding plungers to accommodate the increased rate afforded by dispensing a plurality of charges of plastic material in successive caps at the same time.

It is believed that the advantages of the dispensing device of the invention will be apparent from the foregoing detailed description of a preferred embodiment thereof. It will be apparent that various changes and modifications may be made to the illustrated preferred embodiment of the invention which has been described without departing from the spirit and scope of the invention as sought to be defined in the following claims.

What is claimed is:
1. A device for dispensing predetermined quantities of plastic material comprising a block having a discharge passage, means for heating said block, means for feeding plastic material through the discharge passage, a conveyor, means for continuously moving the conveyor, a dispensing blade mounted for rotation adjacent the exit end of the discharge passage closely and directly overhanging the conveyor, and means for rotating the blade at a selected rate across the exit end of the discharge passage, the blade being rotated continuously and synchronously with the movement of the conveyor to controllably dispense predetermined quantities of plastic material in substantially equally spaced relation with respect to the conveyor.

2. A device as set forth in claim 1 including means for cooling the blade.

3. A device as set forth in claim 1, wherein the conveyor comprises a rotatably mounted turntable having circumferentially spaced notches open to the periphery thereof to receive bottle caps for support on the conveyor, the blade to deposit a predetermined quantity of plastic material in successive caps.

4. A device for dispensing predetermined quantities of plastic material comprising a first block, means for heating said block, a second block adjacent said first block, means for cooling the second block, a discharge passage extending through said first and second blocks, means for feeding plastic material through the discharge passage, means associated with the second block to prevent chilling of plastic material in the discharge passage, a dispensing blade resiliently urged into engagement against said second block and mounted for rotation adjacent the exit end of the discharge passage, the blade being constructed to provide a shearing edge portion and a portion inclined with respect to the shearing edge portion for delivering plastic material cut by the shearing edge portion, and means for rotating the blade at a selected rate across the exit end of the discharge passage to dispense predetermined quantities of plastic material.

5. A device for dispensing predetermined quantities of plastic material comprising a first block, means for heating said block, a second block adjacent said first block, means for cooling the second block, a discharge passage extending through said first and second blocks, means for feeding plastic material through the discharge passage, means associated with the second block to prevent chilling of plastic material in the discharge passage, a conveyor, means for continuously moving the conveyor, a dispensing blade mounted to resiliently engage against said second block, said blade being mounted for rotation adjacent the exit end of the discharge passage and overhanging the conveyor, and means for rotating the blade across the exit end of the discharge passage to dispense predetermined quantities of plastic material, the blade being rotated continuously in the same direction as the direction of movement of the conveyor.

6. A device as set forth in claim 5, wherein the dispensing blade is formed to provide a shearing edge portion and a portion inclined with respect to the shearing edge portion to deliver the sheared plastic material to the conveyor.

7. A device as set forth in claim 5; wherein a plurality of spaced discharge passages are extended through the first and second blocks; wherein means is associated with the second block to prevent chilling of plastic material in each of the plurality of discharge passages; and wherein a dispensing blade is associated with the exit end of each discharge passage.

8. A device as set forth in claim 5; wherein the conveyor comprises a rotatably mounted turntable having circumferentially spaced notches open to the periphery thereof to receive caps for support on the conveyor; and wherein the rotary blade deposits a predetermined quantity of plastic material in successive caps.

9. A device as set forth in claim 5; wherein the first block has a plastic material intake passage in communication with the discharge passage; and wherein a reciprocable measuring plunger is mounted for movement across the exit end of the intake passage and the inlet end of the discharge passage to deliver a predetermined quantity of plastic material from the intake passage to the discharge passage to thereby feed predetermined quantities of plastic material into the discharge passage.

References Cited

UNITED STATES PATENTS

| | | | |
|---|---|---|---|
| 3,025,564 | 3/1962 | Voigt | 18—12 |
| 3,214,796 | 11/1965 | Ginaven | 18—12 |
| 2,539,916 | 1/1951 | Ludington et al. | 18—12 |
| 2,958,099 | 11/1960 | Chisholm et al. | 18—12 |
| 3,135,019 | 6/1964 | Aichele. | |
| 3,230,582 | 1/1966 | Hoffman et al. | 18—12 |

WILLIAM J. STEPHENSON, *Primary Examiner.*